(12) United States Patent
Beguinot et al.

(10) Patent No.: US 9,267,197 B2
(45) Date of Patent: Feb. 23, 2016

(54) MARTENSITIC STAINLESS STEEL FOR INJECTION MOULDS AND INJECTION MOULD FRAMES

(75) Inventors: Jean Beguinot, Le Creusot (FR); Frédéric Bouchaud, Montchanin (FR); Jean Pisseloup, Saint Symphorien de Marmagne (FR)

(73) Assignee: INDUSTEEL FRANCE, St Denis (FR)

( * ) Notice: Subject to any disclaimer, the term of this patent is extended or adjusted under 35 U.S.C. 154(b) by 0 days.

(21) Appl. No.: 11/632,047

(22) PCT Filed: Jul. 6, 2005

(86) PCT No.: PCT/FR2005/001750
§ 371 (c)(1),
(2), (4) Date: Jan. 10, 2007

(87) PCT Pub. No.: WO2006/016043
PCT Pub. Date: Feb. 16, 2006

(65) Prior Publication Data
US 2008/0069719 A1    Mar. 20, 2008

(30) Foreign Application Priority Data
Jul. 12, 2004  (FR) ..................... 04 07764

(51) Int. Cl.
*C22C 38/22* (2006.01)
*C22C 38/60* (2006.01)
*B29C 33/38* (2006.01)
*C22C 38/00* (2006.01)
*C22C 38/42* (2006.01)
*C22C 38/44* (2006.01)
*C22C 38/46* (2006.01)
*C22C 38/58* (2006.01)
*B29C 45/00* (2006.01)

(52) U.S. Cl.
CPC ............... *C22C 38/60* (2013.01); *B29C 33/38* (2013.01); *C22C 38/001* (2013.01); *C22C 38/42* (2013.01); *C22C 38/44* (2013.01); *C22C 38/46* (2013.01); *C22C 38/58* (2013.01); *B29C 45/00* (2013.01)

(58) Field of Classification Search
CPC ..................................................... C23C 38/001
USPC ........................................................ 148/325
See application file for complete search history.

(56) References Cited

U.S. PATENT DOCUMENTS

| | | | | |
|---|---|---|---|---|
| 3,720,545 | A * | 3/1973 | Steven et al. | 148/547 |
| 5,069,870 | A * | 12/1991 | Iseda et al. | 420/70 |
| 6,283,745 | B1 * | 9/2001 | Suzuki | 425/441 |
| 6,358,334 | B2 | 3/2002 | Henn et al. | |
| 6,479,013 | B1 * | 11/2002 | Sera et al. | 420/69 |
| 6,761,853 | B2 * | 7/2004 | Ishida et al. | 420/41 |
| 2002/0162614 | A1 | 11/2002 | Sammt et al. | |
| 2004/0013559 | A1 | 1/2004 | Sandberg et al. | |
| 2005/0274436 | A1 * | 12/2005 | Kondo et al. | 148/326 |

FOREIGN PATENT DOCUMENTS

| | | |
|---|---|---|
| DE | 39 01 470 C1 | 8/1990 |
| DE | 41 33 480 A1 | 4/1993 |
| EP | 0 496 350 A1 | 7/1992 |
| EP | 0 508 574 A1 | 10/1992 |
| EP | 0 994 199 A1 | 4/2000 |
| EP | 1 314 791 A1 | 5/2003 |
| EP | 1 396 552 A1 | 3/2004 |
| JP | 10-110248 A | 4/1998 |
| JP | 10-259458 A | 9/1998 |
| JP | 2000-160297 A | 6/2000 |
| JP | 2001-107195 A | 4/2001 |

* cited by examiner

*Primary Examiner* — Jessee Roe
*Assistant Examiner* — Christopher Kessler
(74) *Attorney, Agent, or Firm* — Sughrue Mion, PLLC; Richard C. Turner

(57) ABSTRACT

The invention concerns mold or mold frame parts for plastic material injection molding made of quenched and tempered martensitic stainless steel consisting, in wt. %, of: 0.02%=C=0.09%, 0.025%=N=0.12% with 0.05%=C+N=0.17%; Si=0.34% Al=0.080% with Si+23 Al=0.20% and Si+0.6 Al=0.25%; and 0.00025=AlxN=0.0020 0; 0.55%=Mn=1.8%; 11.5%=Cr=16% optionally up to 0.48% of copper, up to 0.90% of the sum Mo+W/2, up to 0.90% of nickel, up to 0.090% of vanadium, up to 0.090% of niobium, up to 0.025% of titanium, optionally up to 0.25 of sulphur, the rest being iron and impurities derived from preparation, the composition further satisfying the condition: 6.5=F=(Cr+Mo)+2(Si+V+Nb)−27(C+N)−(Ni+Mn/2+Cu/3)=13.

9 Claims, No Drawings

MARTENSITIC STAINLESS STEEL FOR INJECTION MOULDS AND INJECTION MOULD FRAMES

FIELD OF THE INVENTION

The present invention relates to a martensitic stainless steel for the manufacture of moulds and mould frames for the injection-moulding of plastics materials.

DESCRIPTION OF RELATED ART

The injection-moulding of plastics material requires the use of moulds and mould frames composed of steel having a high mechanical strength capable of withstanding major forces resulting from the strong injection pressures. The manufacture of the moulds and mould frames involves numerous and long machining operations, such as milling or drilling, and therefore a good machinability of the steel is necessary. In addition, since the moulds and mould frames have a function which is not only geometrical but also of a cooling nature in respect of the mouldings, the steel of which they are composed must preferably have a good thermal conductivity in order to facilitate the removal of heat by conduction through the structures of the mould. Finally, the moulds must be able to resist corrosion, which may be corrosion by the injected plastics materials when these plastics materials are corrosive, or corrosion caused by the cooling fluids in the cooling circuits, or corrosion by atmospheric oxidation of the polished cavities of the moulding portions of the moulds.

In order to meet all of those requirements, endeavors are made to use high-strength steels that are also stainless. This prompts a search for stainless steels of the martensitic type and more particularly stainless steels of the martensitic type of series AISI 420 to 440 or steels comparable to those steels.

However, these martensitic stainless steels have relatively high carbon contents which are of the order of from 0.10 to 0.5%, or even higher, and which have the disadvantage of not being very favorable to corrosion resistance and above all of being particularly unfavorable to machining operations. In addition, carbon contents that are too high are detrimental to weldability, which is a property important for mould components, in particular for permitting the repair by welding of those components in cases where re-machining is necessary.

In order to overcome those various disadvantages, there has been proposed, especially in U.S. Pat. No. 6,358,334, a martensitic stainless steel which is intended for the manufacture of moulds for the injection-moulding of plastics material and the carbon content of which does not exceed 0.08%, and which comprises a substantial addition of sulphur, of from 0.06 to 0.3%, in order to improve machinability. This steel, which basically contains from 12 to 14% of chromium, from 0.03 to 0.06% of carbon, from 1 to 1.6% of manganese, from 0.25 to 1% of silicon, from 0.01 to 0.1% of vanadium, from 0.02 to 0.08% of nitrogen, also comprises an addition of copper of from 0.5 to 1.3%, which is to improve the thermal conductivity of the steel. This steel, whose properties are better suited to the manufacture of components for moulds or mould frames than are the martensitic stainless steels of the series AISI 420 to 440 and which also has a hardness of the order of approximately 300 HB, has, however, a double disadvantage. On the one hand, it is difficult to form by hot-rolling because its hot forgeability is not very good. On the other hand, it is not very easy to recycle it because its copper content is substantially greater than the average copper content of stainless steel waste.

BRIEF SUMMARY OF THE INVENTION

The object of the present invention is to overcome those disadvantages by proposing a high-performance stainless steel suitable for the manufacture of moulds or mould frames for the injection-moulding of plastics material, which steel is both easy to machine and easy to weld and which resists corrosion well, which has a good thermal conductivity and which poses few manufacturing problems, in particular few forgeability problems and few recycling problems.

To that end, the invention relates to mould component or mould frame component for the injection-moulding of plastics materials, made of a martensitic stainless steel whose composition comprises, in % by weight:

$0.02\% \leq C \leq 0.09\%$ $0.025\% \leq N \leq 0.12\%$ with $0.05 \leq C+N \leq 0.17\%$ $Si \leq 0.34\%$ $Al \leq 0.080\%$ with $Si + 23\, Al \geq 0.20\%$ and $Si + 0.6\, Al \leq 0.25\%$ and $0.00025 \leq Al \times N \leq 0.0020$ $0.55\% \leq Mn \leq 1.8\%$ $11.5\% \leq Cr \leq 16\%$ optionally up to 0.48% of copper, up to 0.90% of the sum Mo+W/2, up to 0.90% of nickel, up to 0.090% of vanadium, up to 0.090% of niobium, up to 0.025% of titanium, optionally up to 0.25% of sulphur, the balance being iron and impurities resulting from the production operation, the composition also satisfying the condition:

$6.5 \leq F = (Cr+Mo) + 2(Si+V+Nb) - 27(C+N) - (Ni+Mn/2+Cu/3) \leq 13$.

Preferably, the composition of the martensitic stainless steel satisfies one or more of the following conditions:

$Si + 0.6\, Al < 0.25\%$ $Cu \leq 0.4\%$ $Al \times N \geq 0.00050$.

Preferably, the composition of the martensitic stainless steel satisfies at least one of the following conditions:

$Ni \geq 0.10\%$ $V \geq 0.015\%$ $Mo + W/2 \geq 0.10\%$.

The composition of the martensitic stainless steel may satisfy the condition:

$7.0 \leq F \leq 8.9$ when a very good suitability for polishing is sought, or otherwise satisfies the condition:

$9.0 \leq F \leq 11.5$.

The mould component or the mould frame component for the injection of plastics material is composed of a martensitic stainless steel according to the invention, which is quenched and tempered.

Preferably, the structure of the steel of which the component is composed contains less than 20% of δ ferrite, the balance being martensite. It is even more preferable for the structure of the steel to contain less than 10% of δ ferrite, the balance being martensite.

DETAILED DESCRIPTION OF THE INVENTION

The invention will now be described in more detail but in a manner which is non-limiting and illustrated by examples.

The inventors found in a novel and unexpected manner that, in martensitic stainless steels, the favorable effect of copper on thermal conductivity could be replaced by a significant reduction in the silicon content, and the favorable effect of copper on corrosion could be compensated for by an increase in the content of molybdenum or nitrogen.

Starting from those observations, the inventors found that it was possible to obtain a martensitic stainless steel having satisfactory properties for the manufacture of mould components, and also a good forgeability, by significantly reducing the copper content, by significantly reducing the silicon content and by optionally adding molybdenum or nitrogen or a combination of those two elements.

Bearing those observations in mind, the steel according to the invention is a stainless steel of the martensitic type whose composition comprises, by weight, the contents defined below.

More than 0.02%, preferably more than 0.03%, of carbon, in order to contribute to hardening, but not more than 0.09%, preferably not more than 0.06%, and preferably not more than 0.05%, of carbon in order not to impair corrosion resistance;

At least 0.025%, and preferably at least 0.035% of nitrogen in order to improve the mechanical strength of the steel and its resistance to corrosion, but less than 0.12%, and preferably less than 0.10%, or even less than 0.075%, of nitrogen in order to reduce the tendency to form undesirable chromium nitrides; these chromium nitrides having an embrittling effect and tending to reduce the content of free chromium, which is detrimental to corrosion resistance;

The contents of carbon and nitrogen are adjusted in such a manner that, within the limits which have just been defined, the sum of the contents of carbon and nitrogen is greater than or equal to 0.05% and preferably greater than or equal to 0.07%, in order to ensure a sufficient contribution to hardening on tempering by the formation of carbides and nitrides, but the sum of the contents of carbon and nitrogen must preferably not exceed 0.17%, more advantageously 0.14% and even more advantageously 0.11%, in order not to lead to hardening that would be excessive for the application under consideration here, to avoid impairment to toughness and finally not to reduce resistance to corrosion too greatly by the local reduction in the content of chromium partially fixed in the form of carbonitrides.

In order to improve machinability, especially with respect to milling and drilling, it is possible to add sulphur, in particular when the surface-quality requirements (polished quality, or grained surfaces) are not high, especially when the steel is used to manufacture mould frames or to manufacture cavities for moulding plastics material that have a low aesthetic requirement. In that case, the content of sulphur must preferably be at least 0.05%, more preferably at least 0.075%, and even more advantageously at least 0.10%. However, the maximum contents of sulphur must be less than 0.25%, preferably 0.20%, and even more advantageously 0.15% in order not to impair the forgeability of the steel, its corrosion resistance and its toughness.

Silicon and aluminium are elements that help to ensure good deoxidation of the steel bath, and from that point of view their presence is desirable. In particular, it is necessary for the contents of silicon and aluminum to be such that $Si+23\times Al \geq 0.20\%$ and preferably $\geq 0.35\%$. However, the inventors have found that a reduction to the lowest possible level of the content of silicon, and to a lesser extent of the content of aluminum, makes it possible to compensate partially, but in a very significant manner, for the very unfavorable effect of a high content of chromium on the thermal conductivity of the steel. This poor thermal conductivity of high-chromium steels is especially detrimental in the application of moulds for the injection-moulding of plastics material, for which the efficient removal of heat, permitting a rapid solidification of the articles of injected plastics material, constitutes one of the important functionalities in use.

In order to obtain good thermal conductivity, it is therefore desirable for the contents of silicon and aluminum to be such that: $Si+0.6\times Al \leq 0.25\%$, and more advantageously $\leq 0.17\%$.

In addition, and in order to ensure satisfactory suitability for rolling or forging, that is to say, leading to a hot-forming temperature range sufficiently wide to permit, in general, rolling in a single heating operation without intermediate heating, the contents of aluminum and nitrogen must be such that: $Al \leq 0.0020/N$, and preferably $\leq 0.0010/N$. In addition, and to control the enlargement of the grain in order to limit the size of the grain during thermal treatment and thus to ensure a satisfactory grain size after carrying out quality processing, the contents of aluminum and nitrogen must be such that: $Al \geq 0.00025/N$ and preferably $\geq 0.00050/N$.

Manganese is particularly desirable for fixing the sulphur in the form of manganese sulphides in order to limit the detrimental role of sulphur on the brittleness of the steel. Therefore, the manganese content must preferably be such that: $Mn \geq 0.3\% + 5 \times S$.

Furthermore, manganese increases quenchability and reduces the content of ferrites in the substantially martensitic structure obtained after quenching.

For this reason, the manganese content is greater than or equal to 0.55%, and more advantageously greater than or equal to 0.75%, and even more advantageously greater than or equal to 1.05%. However, when the manganese content is too high, this element impairs toughness. Therefore, the manganese content must be less than or equal to 1.8%, and preferably less than or equal to 1.6%.

The chromium content, which provides resistance to corrosion, must be greater than or equal to 11.5% and preferably greater than or equal to 12%. However, and in order to limit the presence of δ ferrite, which is a soft constituent, in the structures obtained after quenching, the chromium content must be less than or equal to 16%, and preferably less than or equal to 15%, more advantageously less than or equal to 14%, and even more advantageously less than or equal to 13%.

The copper content is less than or equal to 0.48%, preferably less than or equal to 0.4%, and may even be as low as desired, in order not to impair the suitability for hot deformation, and in order to lead to waste which is less difficult to recycle.

As indicated above, although copper has a favorable effect on corrosion resistance and on the delta ferrite content, the inventors found that it was possible to preserve, or even to reinforce, the advantages of the high content of copper, especially by adding molybdenum and by reducing the silicon content as much as possible.

However, copper is often present as a residual in scrap metal, so that, in order to limit the extra costs associated with sorting the scrap, which is necessary in order to obtain a very low copper content, a copper content introduced by scrap metal which is greater than 0.1%, or indeed greater than 0.2%, or even greater than 0.31% and, even more advantageously, greater than 0.35%, may be accepted.

Molybdenum has the advantage of improving quenchability, which promotes the production of a martensitic microstructure which is desirable for optimizing the compromise between tensile strength and toughness.

This element also promotes strong resistance to softening on tempering. Finally, it contributes greatly to corrosion resistance. However, it is very expensive and promotes the formation of δ ferrite. Therefore, the maximum content of molybdenum will not exceed 0.90% and preferably not 0.48%, and even more advantageously not 0.35%. The presence of this element is not indispensable and its minimum content may be simply 0% or at trace levels. However, it is preferable for the minimum content of molybdenum to be at least 0.10% and preferably at least 0.20% and even more advantageously 0.30%.

The molybdenum may optionally be replaced by tungsten at the rate of 2% of tungsten for 1% of molybdenum. However, it is not desirable to replace the molybdenum by tungsten, in particular owing to the cost of tungsten which is particularly high.

Likewise, cobalt, which has a comparable effect, could be added. However, this is not desirable and therefore the content of this element will preferably be less than or equal to 0.010%. That is to say that this element will be in a trace or impurity state.

Nickel is an element favorable to toughness. Furthermore, it is a gamma-producing element which enables the effects of alpha-producing elements added to reinforce corrosion resistance to be compensated for. This element may, therefore, be added, without its presence being compulsory. Therefore, the minimum nickel content may be 0% or at trace levels, but it is advantageous for its content to be greater than or equal to 0.10% and even more advantageously greater than or equal to 0.20%. However, its high cost means that a content greater than 0.95% is not desirable. Preferably, the nickel content is less than or equal to 0.48%.

Vanadium may be present in the state of a residual. Bearing in mind the content of chromium in the steel, production by the conventional route using an electric furnace may lead to residual contents of up to approximately 0.05% without any guarantee of a controlled minimum value. However, vanadium may optionally be used as a controlled addition for its hardening function during tempering, with a minimum content of 0.015%. Nevertheless, owing in particular to its cost and its unfavourable influence on machinability, it is desirable for the vanadium content not to exceed 0.090%.

Niobium has effects analogous to that of vanadium and, likewise, its content must not exceed 0.090%. Furthermore, this element is detrimental to forgeability. It is therefore desirable for its content to be less than 0.020%, and more advantageously less than 0.010%, and even more advantageously, for this element to be only in a trace amount.

Although the presence of titanium is not desired owing to the hardness of the nitrided or carbided titanium components which may significantly impair machinability, this element may optionally be added in order to control the enlargement of the grain in the course of thermal treatments. In that case, the titanium content must not exceed 0.0025% and preferably should be from 0.010% to 0.020%.

In addition, and in order for the size of the titanium nitrides to be small and in particular to be less than approximately 1 micron, it is very desirable for the titanium to be added to the liquid steel bath at the time of production in a progressive manner starting from addition to a slag and by very progressive transfer to metal/nitride contact.

The balance of the composition is constituted by iron and impurities.

Apart from the conditions which have just been indicated in respect of the contents of each of the elements, it is desirable for the composition to be adjusted in such a manner as to limit the content of δ ferrite which is not capable of being converted into martensite and whose presence is detrimental to polishability, strength and corrosion resistance. In particular, it is desirable for the proportion of δ ferrite to be less than or equal to 20% or even more advantageously less than or equal to 10% in a principally martensitic structure.

For that purpose, the composition must satisfy the following condition:

$$6.5 \leq F \leq 13$$

and preferably $7.0 \leq F \leq 11.5$, with:

$$F = (Cr+Mo) + 2(Si+V+Nb) - 27(C+N) - (Ni+Mn/2+Cu/3).$$

Within these limits, two sub-ranges may be distinguished. On the one hand, the sub-range corresponding to F from 7.0 to 8.9 which is more favorable to good homogeneity of the metal and to good polishability and, on the other hand, the range corresponding to F from 9.0 to 11.5. An interesting compromise corresponds to 8.5 less than or equal to F less than or equal to 10.5.

In general, this steel is produced by known methods, for example using an electric furnace. Optionally, in order to add titanium, this element is added to a slag and the titanium is transferred to the liquid steel bath by coming into contact with the slag metal, and the liquid steel is cast in the form of slabs or bars which are hot-formed, either by rolling or by forging. Thermal treatment is then carried out and is constituted by austenitization at approximately 950° followed by a cooling operation converting the austenite into martensite (which may be simple cooling in the air for thicknesses of less than approximately 100 mm or any other quenching means) and tempering at a preferred temperature of from 500° C. to 550° C., in order to obtain a hardness of from 250 HB to 400 HB and typically approximately 300 HB. The mould components or mould frame components are then machined.

By way of example, the steels whose chemical compositions are entered in Table 1 may be produced.

| C | Si | Al | Mn | Ni | Cr | Mo | Cu | N | V | Nb | S | Delta ferrite (%) | HB hardness | Therm. conductivity | Corrosion resistance index |
|---|---|---|---|---|---|---|---|---|---|---|---|---|---|---|---|
| 0.041 | 0.42 | 0.027 | 1.15 | 0.25 | 12.7 | 0.015 | 0.85 | 0.051 | 0.045 | 0 | 0.14 | 8 | 310 | 22.2 | 15.1 |
| 0.04 | 0.38 | 0.025 | 1.2 | 0.3 | 12.6 | 0.018 | 0.43 | 0.048 | 0.041 | 0 | 0.03 | 10 | 295 | 22.8 | 14.5 |

-continued

| C | Si | Al | Mn | Ni | Cr | Mo | Cu | N | V | Nb | S | Delta ferrite (%) | HB hardness | Therm. conductivity | Corrosion resistance index |
|---|---|---|---|---|---|---|---|---|---|---|---|---|---|---|---|
| 0.04 | 0.31 | 0.02 | 1.37 | 0.22 | 12.5 | 0.017 | 0.4 | 0.05 | 0.042 | 0 | 0.12 | 9 | 305 | 23.4 | 14.5 |
| 0.039 | 0.09 | 0.035 | 1.41 | 0.27 | 12.7 | 0.017 | 0.42 | 0.047 | 0.04 | 0 | 0.12 | 6 | 300 | 25.4 | 14.6 |
| 0.042 | 0.19 | 0.028 | 1.44 | 0.29 | 12.7 | 0.24 | 0.42 | 0.052 | 0.04 | 0 | 0.1 | 8 | 325 | 24.0 | 15.5 |
| 0.039 | 0.11 | 0.025 | 1.39 | 0.34 | 12.5 | 0.27 | 0.38 | 0.053 | 0.04 | 0 | 0.14 | 6 | 330 | 25.1 | 15.4 |
| 0.04 | 0.1 | 0.007 | 1.25 | 0.32 | 13.1 | 0.28 | 0.41 | 0.053 | 0.04 | 0 | 0.045 | 10 | 325 | 24.9 | 16.0 |
| 0.039 | 0.21 | 0.011 | 1.41 | 0.27 | 12.3 | 0.53 | 0.35 | 0.053 | 0.043 | 0 | 0.12 | 8 | 340 | 24.0 | 16.0 |
| 0.042 | 0.085 | 0.027 | 1.4 | 0.27 | 13.1 | 0.49 | 0.39 | 0.054 | 0.035 | 0 | 0.16 | 10 | 335 | 24.7 | 16.7 |
| 0.033 | 0.15 | 0.015 | 1.25 | 0.3 | 14 | 0.85 | 0.18 | 0.041 | 0.033 | 0.035 | 0.15 | 14 | 340 | 23.4 | 18.2 |
| 0.051 | 0.09 | 0.033 | 1.38 | 0.33 | 12.2 | 0.22 | 0.37 | 0.059 | 0.03 | 0.04 | 0.15 | 4 | 330 | 25.6 | 15.1 |
| 0.05 | 0.12 | 0.02 | 1.35 | 0.7 | 13.2 | 0.75 | 0.27 | 0.049 | 0.035 | 0.051 | 0.17 | 8 | 350 | 23.6 | 17.4 |
| 0.042 | 0.06 | 0.035 | 1.1 | 0.25 | 12.9 | 0.37 | 0.25 | 0.052 | 0.037 | 0.025 | 0.1 | 8 | 325 | 26.1 | 15.9 |
| 0.052 | 0.11 | 0.022 | 1.45 | 0.8 | 12.1 | 0.25 | 0.43 | 0.068 | 0.027 | 0.023 | 0.12 | 0 | 330 | 24.5 | 15.4 |
| 0.078 | 0.095 | 0.02 | 1.39 | 0.75 | 12.3 | 0.23 | 0.38 | 0.072 | 0.025 | 0 | 0.17 | 0 | 345 | 24.7 | 15.6 |

Percentages of δ ferrite obtained, the HB hardness obtained after thermal treatment of tempering at 520° C., the thermal conductivity of the steel and a corrosion index equal to:

Cr+3.3 Mo+Cu+30N are also entered in the Table.

In this Table, the steel of the first line is a comparison steel corresponding to the prior art, and the other steels are steels according to the invention.

As can be seen in the Table, the content of δ ferrite is always less than 20% and is generally approximately 10%, as for the steel of the prior art. The HB hardness of the steel ranges from 295 HB to 350 HB and the corrosion resistance index ranges from 14.5 to 18.2, this last value being very substantially higher than the corrosion resistance index of the comparison steel. Finally, the thermal conductivity ranges from 22.8 to 26.1 W/m/° C., which, in all cases, is higher, even substantially higher, than the thermal conductivity of the comparison steel. In addition, the steel according to the invention is used without any difficulty in respect of hot-forming, forgeability always being very satisfactory. It will be appreciated that the copper contents, which are less than or equal to 0.43%, are close to the contents which are conventional in scrap metal and this enables the waste from the steel according to the invention to be recycled without difficulty.

The invention claimed is:

1. Mold component or mold frame component for the injection-molding of plastics materials, which component is composed of quenched and tempered martensitic stainless steel whose composition consists of, in % by weight:

$0.02\% \leq C \leq 0.09\%$ $0.025\% \leq N \leq 0.12\%$ with $0.05\% \leq C+N \leq 0.14\%$ $Si < 0.17\%$ $Al \leq 0.080\%$ with $Si+23 \, Al \geq 0.20\%$ and $Si+0.6 \, Al \leq 0.17\%$ and $0.00025 \leq Al \times N \leq 0.0020$ $1.05 < Mn \leq 1.8\%$ $11.5\% \leq Cr \leq 16\%$ $0 < Ti \leq 0.020\%$ $0.05\% \leq S < 0.25\%$ optionally up to 0.48% of copper, up to 0.90% of the sum Mo+W/2, up to 0.48% of nickel, up to 0.090% of vanadium, and up to 0.090% of niobium, the balance being iron and impurities resulting from the production operation, the composition also satisfying the condition:

$6.5 \leq F=(Cr+Mo)+2(Si+V+Nb)-27(C+N)-(Ni+Mn/2+Cu/3) \leq 13$.

2. Component according to claim 1, wherein: $Cu \leq 0.4\%$.

3. Component according to claim 1 or claim 2, wherein: $Al \times N \geq 0.00050$.

4. Component according to claim 1 or 2, wherein the composition satisfies at least one of the following conditions:

$Ni \geq 0.10\%$ $V \geq 0.015\%$ $Mo+W/2 \geq 0.10\%$.

5. Component according to claim 1 or 2, wherein the composition satisfies the condition: $7.0 \leq F \leq 8.9$.

6. Component according to claim 1 or 2, wherein the composition satisfies the condition: $9.0 \leq F \leq 11.5$.

7. Component according to claim 1 or 2, wherein: $Nb < 0.020\%$.

8. Component according to claim 1 or 2, wherein the structure of the steel contains less than 20% of δ ferrite, the balance being martensite.

9. Component according to claim 8, wherein the structure of the steel contains less than 10% of δ ferrite, the balance being martensite.

* * * * *